Patented Sept. 12, 1933

1,926,676

UNITED STATES PATENT OFFICE 1,926,676

PROCESS OF PREPARING HYDROCARBONS

Ivan Gubelmann and Clyde O. Henke, South Milwaukee, Wis., assignors, by mesne assignments, to Newport Industries, Inc., a corporation of Delaware No Drawing. Application March 18, 1929
Serial No. 348,123

5 Claims. (Cl. 260—168)

This invention relates to a process of preparing hydrocarbons from abietic acid or abietic acid containing materials, and relates more particularly to the catalytic decomposition of abietic acid or volatile material containing the abietic acid radical by passing a gas containing abietic acid over or through a catalytic mass at an elevated temperature.

It is an object of this invention to provide a method of obtaining valuable hydrocarbons from abietic acid containing material in an economically practical manner.

Other and further important objects of this invention will become apparent from the following description and appended claims.

Among the known hydrocarbons which can be obtained by the present process in relatively good yields, are retene, and abietene. Other hydrocarbons that have not as yet been completely identified have also been prepared by this method.

The process comprises briefly passing a gaseous mixture containing the vapors of abietic acid through a catalytic mass maintained at an elevated temperature. The gaseous mixture may contain, in addition to abietic acid, steam, air, ammonia, hydrochloric acid gas and the like. Preferably, a mixture consisting principally of steam and abietic acid vapors, is used.

The catalytic mass that is employed may be any one of a large number of catalysts which are employed for a similar purpose. The most probable reaction involved is the removal of $CO_2$ and of hydrogen and alkyl radicals. Depending upon the particular reaction to be brought about, a specific catalyst is selected, since different catalysts have somewhat different catalytic activities. The use of charcoal is particularly effective in the removal of carbon dioxide to produce abietene. The use of vanadium pentoxide is particularly valuable in effecting a dehydrogenation or a dealkylation.

In this process, as in other catalytic processes, a wide variety of different materials may be used as catalysts and these materials may be prepared in various ways. Likewise, mixtures of two or more catalysts, catalyst supports or carriers may be used. Among the various catalysts we have used may be mentioned vanadium pentoxide, zinc oxide, chromium oxide, manganese oxide, copper oxide, molybdic acid, anhydride, charcoal and others.

The temperatures employed for the reactions are subject to wide variation, and temperatures from 350 to 650° C. have been used. The temperature to be employed will depend upon the catalyst used and upon the particular product desired. For instance, in the use of vanadium pentoxide as the catalyst if a temperature of 520° C. is employed, retene is produced. When using the same catalyst and temperatures of about 600° C. another hydrocarbon having a melting point of 170° C. is obtained.

While we prefer to work at atmospheric pressure or with just sufficient pressure on the apparatus to cause a flow of vapors through it, higher or lower pressures may be employed and are contained within the scope of this invention.

The invention in its broadest aspect comprises all processes for producing hydrocarbons by the catalytic decomposition of abietic acid containing material in vapor phase at an elevated temperature. The following examples are given merely by way of illustration and it is to be understood that the invention is not limited to these specific examples.

Example I

Abietic acid is vaporized by passing steam through the molten abietic acid at 220 to 240° C. These vapors are then brought into contact with activated charcoal held at a temperature of 410° C. The treated vapors are then condensed, to obtain an oil which contains only very small quantities of undecomposed abietic acid. The crude oil as obtained has a specific gravity of 0.967 at 20° C. and distills for the most part between 330 and 360° C. The main constituent of this oil is abietene.

If instead of abietic acid ethyl abietate is vaporized and contacted with activated charcoal according to the above example, the product obtained is substantially the same, consisting for the most part of abietene.

If in the above example the catalyst is omitted, the condenser fills with white crystals which are essentially abietic acid.

Example II

Abietic acid is vaporized as before by passing steam through the molten abietic acid at 220 to 240° C. These vapors are brought into contact with vanadium pentoxide by passing the vapors through it. The vanadium pentoxide is held at a temperature of 520° C. The decomposition products are then condensed to produce a product in the form of an oily paste, comprising a mixture of hydrocarbons and some undecomposed abietic acid. The oily paste is separated from the water and then fractionally distilled in vacuo.

The fraction distilling between 190 and 240° C. at a pressure of 4 mm. is collected and crystallized from acetic acid or alcohol. The crystals obtained have a melting point of 100.6° C. and correspond in analysis to retene. In order to work more efficiently in the economy of raw materials, the other fractions resulting from the distillation and crystallization steps may be further catalytically decomposed as above to give further quantities of retene.

If instead of abietic acid ethyl abietate is vaporized and contacted with vanadium pentoxide according to the above example, the product obtained is substantially the same from which retene may be isolated as above.

Example III

The vapors of abietic acid are produced as in Examples I and II, with abietic acid and steam and then passed over vanadium pentoxide held at a temperature of 600° C. The vapors are then condensed and the condensate worked up as in Example II. The product obtained is different from that obtained in Example II, and by combustion analysis is found to contain 92.7% carbon and 6.86% hydrogen. The product has a melting point of 169 to 170° C. after it has been recrystallized from glacial acetic acid. The compound is most probably iso-propyl-phenanthrene.

We are aware that many changes may be made in the above examples to produce various mixtures of hydrocarbons as above described. Other catalysts than those specified in the examples may be employed and various temperatures, depending upon the product desired. Furthermore, instead of using abietic acid as such, abietic acid containing materials such as wood or gum rosin, or purified rosin, from the crude rosin may be used.

Any of the various isomers of abietic acid which are commonly referred to generically as "abietic acids", for instance, sapinic, pyro-abietic, pine-abietic, and pimaric acids, may be used. Furthermore, instead of the acid form, any of its derivatives, such as esters or anhydrides, may be used, so long as the derivative retains the property of vaporizing at the temperatures indicated.

We are aware that numerous details of the process may be varied through a wide range without departing from the principles of this invention, and we, therefore, do not purpose limiting the patent granted hereon otherwise than necessitated by the prior art.

We claim as our invention:

1. In the process of preparing hydrocarbons by the thermal decomposition of abietic acid containing material the step which comprises decomposing said material while in the vapor phase by passing the vapors over activated charcoal at temperatures between 350° and 650° C.

2. The process of producing abietene which comprises vaporizing abietic acid, and passing the vapors into contact with activated charcoal held at a temperature of 410 degrees C.

3. The process of preparing hydrocarbons, which comprises passing vapors of abietic acid containing material into contact with a catalyst selected from the group consisting of vanadium pentoxide, zinc oxide, chromium oxide, manganese oxide, copper oxide, molybdic acid anhydride and charcoal at temperatures between 350° and 650° C.

4. The process of producing hydrocarbons, which comprises passing vapors containing abietic acid and steam into contact with a catalyst selected from a group consisting of vanadium pentoxide, zinc oxide, chromium oxide, manganese oxide, copper oxide, molybdic acid anhydride and charcoal at temperatures between 350° and 650° C.

5. The process of producing hydrocarbons, which comprises passing steam through molten abietic acid at temperatures from 220° to 240° C., contacting the vapor produced with vanadium pentoxide held at a temperature between 520° and 600° C, condensing the decomposition products formed and purifying said products.

IVAN GUBELMANN.
CLYDE O. HENKE.